US011169718B2

(12) United States Patent
Xu et al.

(10) Patent No.: US 11,169,718 B2
(45) Date of Patent: Nov. 9, 2021

(54) DATA ACCESS METHOD AND APPARATUS

(71) Applicant: BEIJING BAIDU NETCOM SCIENCE AND TECHNOLOGY CO., LTD., Beijing (CN)

(72) Inventors: Yingnan Xu, Beijing (CN); Xueliang Du, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/853,617

(22) Filed: Apr. 20, 2020

(65) Prior Publication Data

US 2021/0034257 A1 Feb. 4, 2021

(30) Foreign Application Priority Data

Jul. 31, 2019 (CN) .......................... 201910704510.X (51) Int. Cl.
*G06F 3/06* (2006.01)

(52) U.S. Cl.
CPC .......... *G06F 3/0622* (2013.01); *G06F 3/0659* (2013.01); *G06F 3/0673* (2013.01)

(58) Field of Classification Search
CPC ..... G06F 3/0622; G06F 3/0659; G06F 3/0673
USPC ....................................................... 711/163
See application file for complete search history.

(56) References Cited

U.S. PATENT DOCUMENTS 9,479,504 B2* 10/2016 Bae .......................... H04L 63/10
9,652,177 B2* 5/2017 Kang .................... G06F 3/0659
9,960,835 B2* 5/2018 Lauer ................. H04B 7/18506
10,431,581 B1* 10/2019 Li ........................ H01L 21/8249
10,846,124 B2* 11/2020 Ni ........................ G06F 9/45558
2009/0089866 A1* 4/2009 Yato ...................... H04L 63/083
726/6

(Continued)

FOREIGN PATENT DOCUMENTS

JP 2007148621 A 6/2007
JP 2012181585 A 9/2012
(Continued)

OTHER PUBLICATIONS

European Patent Application No. 20166328.3 extended Search and Opinion dated Dec. 11, 2020, 9 pages.

(Continued)

*Primary Examiner* — Christopher B Shin
(74) *Attorney, Agent, or Firm* — Lathrop GPM LLP (57) ABSTRACT

Embodiments of the present disclosure relate to a data access method and apparatus, an electronic device, and a computer-readable storage medium. The method may include, in response to receiving a first access request sent from a first access device in a set of access devices to a first storage device in a set of storage devices, sending an updated first access request to the first storage device, the first access request including identity information of the first access device. The method may further include, in response to receiving data from the set of storage devices, determining identity information included in the data. The method may further include, in response to the determined identity information being corresponding to the identity information of the first access device, sending the data to the first access device.

11 Claims, 4 Drawing Sheets

(56) References Cited

U.S. PATENT DOCUMENTS

| | | | |
|---|---|---|---|
| 2011/0145500 A1* | 6/2011 | Miura | G06F 13/1689 |
| | | | 711/118 |
| 2012/0159037 A1* | 6/2012 | Kwon | G06F 13/4022 |
| | | | 710/317 |
| 2014/0165160 A1 | 6/2014 | Bae et al. | |
| 2017/0318093 A1 | 11/2017 | Muhlestein et al. | |
| 2018/0063076 A1 | 3/2018 | Field | |
| 2019/0196990 A1 | 6/2019 | Laughton et al. | |
| 2020/0104261 A1* | 4/2020 | Oh | G06F 12/0882 |

FOREIGN PATENT DOCUMENTS

| | | | |
|---|---|---|---|
| WO | WO 2012140848 A1 | 10/2012 | |
| WO | WO 2014027445 A1 | 2/2014 | |

OTHER PUBLICATIONS

Japanese Patent Application No. 2020-114732 Office Action dated Aug. 3, 2021, 4 pages.
Japanese Patent Application No. 2020-114732 English translation of Office Action dated Aug. 3, 2021, 4 pages.

* cited by examiner

DATA ACCESS METHOD AND APPARATUS

CROSS REFERENCE TO RELATED APPLICATIONS

This application is based on and claims priority to Chinese patent application Serial No. 201910704510.X, filed on Jul. 31, 2019, the entire contents of which are incorporated herein by reference.

TECHNICAL FIELD

The present disclosure relates to a field of computer technologies, and more particularly to a data access method and apparatus, an electronic device and a computer readable storage medium.

BACKGROUND

Memory is generally used to store programs and data, which is an important component of a computer. A network-on-chip (NOC) will be used in a complex system-on-chip (SOC system) to interconnect multiple master and slave devices due to a large number of master and slave devices, which results in delays on different paths connecting master and slave devices. In addition to the effects of NOC, factors such as the storage medium constituting the global memory, the corresponding storage controller and the like will also have a significant impact on delays of accessing the memory.

For example, when multiple processor cores in a group of processor cores simultaneously access one or more global memories, since there is only one memory access channel in the current group of processor cores, access requests from other processor cores will be blocked if queuing occurs and the access request with longer memory access delay comes first, resulting in memory access block between multiple processor cores.

SUMMARY

According to exemplary embodiments of the present disclosure, a solution of supporting communication between multiple chips is provided.

In a first aspect of the present disclosure, a data access method is provided. The method may include, in response to receiving a first access request sent from a first access device in a set of access devices to a first storage device in a set of storage devices, sending an updated first access request to the first storage device, the first access request including identity information of the first access device. The method may further include, in response to receiving data from the set of storage devices, determining identity information included in the data. The method may further include, in response to the determined identity information being corresponding to the identity information of the first access device, sending the data to the first access device.

In a second aspect of the present disclosure, a data access apparatus is provided. The apparatus includes: a first access request sending module, configured to send an updated first access request to the first storage device, in response to receiving a first access request sent from a first access device in a set of access devices to a first storage device in a set of storage devices, the updated first access request including identity information of the first access device; an identity information determining module, configured to, in response to receiving data from the set of storage devices, determine identity information included in the data; and a data sending module, configured to send the data to the first access device, in response to the determined identity information being corresponding to the identity information of the first access device.

In a third aspect of the present disclosure, an electronic device is provided. The electronic device includes: one or more processors; and a storage apparatus, configured to store one or more programs which, when executed by the one or more processors, cause the one or more processors to carry out the method according to the first aspect of the present disclosure.

In a fourth aspect of the present disclosure, a computer-readable storage medium is provided. The storage medium has computer programs stored thereon which, when executed by a processor, carry out the method according to the first aspect of the present disclosure.

It should be understood that the content described in the summary is neither intended to limit key or important features of embodiments of the present disclosure, nor to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent with reference to the accompanying drawings and following detailed description. In the drawings, the same or similar elements are denoted by the same or similar reference numerals, in which.

DETAILED DESCRIPTION

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth herein, but rather these embodiments are provided for more thoroughly and completely understanding the present disclosure. It should be understood that the drawings and embodiments of the present disclosure are only used for explanatory purposes, but not to limit the protection scope of the present disclosure.

In the description of embodiments of the present disclosure, the term "including" and similar words should be understood as openly including, that is, "including but not limited to". The term "based on" should be understood as "based at least in part on". The term "one embodiment" or "the embodiment" should be understood as "at least one embodiment". The terms such as "first", "second" and the like may refer to different or the same objects. Other explicit and implicit definitions may be included below.

As mentioned above, there is an urgent need for a method that supports two or more access devices (i.e., processor cores) in a set of access devices (i.e., a cluster of processor cores) to access storage devices, so as to achieve a fast, efficient and low-cost memory access mechanism. The traditional data access method is generally that: another access device in a set of access devices is allowed to send an access request to storage devices after the process from initiating an access request to receiving data is completed by one access device in the set of access devices. Obviously, there is a problem of inefficiency. In order to solve this problem, two data access mechanisms have been developed at present, wherein one method is to use independent memory access interfaces for multiple access devices, and the other method is to increase the cache of memory access channels.

The number of access devices needs to be limited for the first method, otherwise the complexity of network-on-chip will be significantly increased. In addition, there may be over-design problems due to the limited bandwidth of global storage when the number of access devices is large. Therefore, the first method is only applicable to scenarios where the number of access devices is small, and the number of access devices cannot be expanded. The complexity of the required hardware is relatively high for the second method, which will bring additional area and power consumption overhead. In addition, in the case where storage spaces to be accessed by multiple access devices are relatively different, the hit rate of the increased cache will decrease, so that the problem of memory access block between multiple access devices is still serious.

According to an embodiment of the present disclosure, a data access solution is proposed. In this solution, an access request sent from each in the set of access devices may be marked with identity information corresponding to the respective access device. As the recognition granularity of the set of access devices is further refined, the order of data returned from respective storage devices may be disturbed. Furthermore, different from the traditional situation where the next access device is allowed to send an access request to the storage device after the current access device receives data, the next access device may be allowed to send an access request as long as the access request of the current access device is sent from the set of access devices side. This solution makes full use of features of the network-on-chip and disturbs the order of data received from respective storage devices by marking the respective identity information, so that the next access device does not need to await a period of time for which the access request is sent via the network-on-chip to the storage device and data is returned from the storage device via the network-on-chip to the current access device, thereby significantly improving the efficiency of data access.

Figure 1:
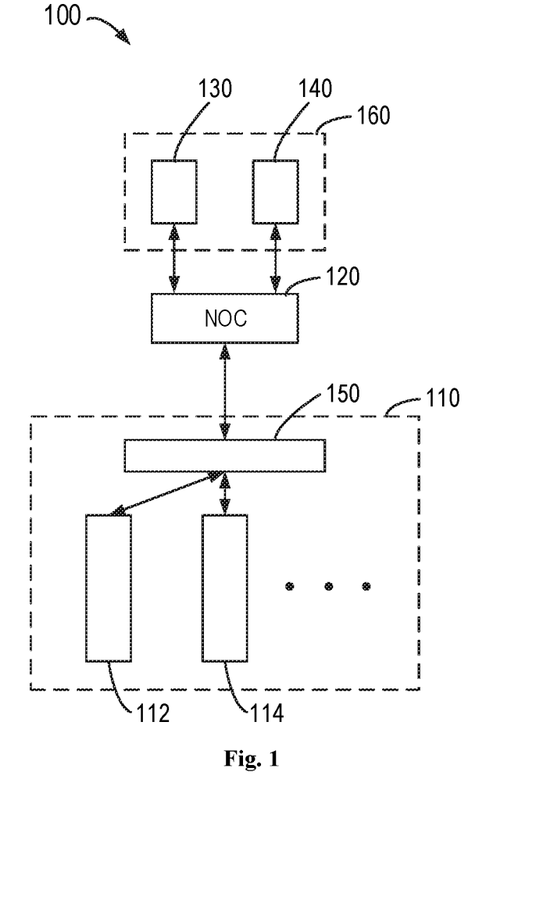
FIG. 1 illustrates a schematic diagram of an example environment in which various embodiments according to the present disclosure may be implemented.

In order to describe, in more detail, the topology structure associated with the network-on-chip in various embodiments of the present disclosure, it is necessary to briefly explain the example environment of embodiments of the present disclosure first. FIG. 1 illustrates a schematic diagram of an example environment 100 in which various embodiments of the present disclosure may be implemented. As illustrated in FIG. 1, a set 110 of access devices as master devices are communicationally connected to the storage device 130 and storage device 140 as slave devices via a network-on-chip (NOC) 120. The set 110 of access devices includes a plurality of access devices, for example, an access device 112, an access device 114 and the like. In addition, the set 110 of access devices also includes a processing device 150.

In a conventional data access solution, when multiple access devices including the access device 112 and the access device 114 in the set 110 of access devices send access requests to the storage device 130 and/or the storage device 140 in the set 160 of storage devices, respectively, the access request sent first by for example, the access device 112 may be first forwarded to the NOC 120 by the processing device 150. However, before the requested data from the storage device 130 or the storage device 140 is returned to the access device 112, all access requests from other access devices such as the access device 114 need to be queued. This is the root reason why memory access block between multiple accesses devices in the set 110 of access devices occurs.

To solve this problem, the processing device 150 is configured to mark each received access request with identity information corresponding to the access device that sends respective access request. For example, when the processing device 150 receives the access request from the access device 112, this access request is processed by the processing device 150, so that the access request is marked with the identity information of the access device 112. Similarly, when the processing device 150 receives the access request from the access device 114, this access request is processed by the processing device 150, so that the access request is marked with the identity information of the access device 114. Since each access request is marked with the corresponding identity information, when the data is returned from the storage device 130 or the storage device 140 via the NOC 120, the access device to which data should be returned may be determined by the processing device 150 based on the identity information related to data transmission.

As an example, the storage device 130 may be one of high-bandwidth memory (HBM) and SRAM, and the storage device 140 may be the other of high-bandwidth memory (HBM) and SRAM. In some embodiments, the storage device 130 and the storage device 140 are the same storage device, e.g. SRAM. That is, multiple access devices in the set 110 of access devices may all access the same storage device in some embodiments.

It should be noted that the above expression about identity information of access devices is exemplary only, and not limiting the present invention. For example, "the access request is marked with the identity information of the access device 112" is not only used to define that the access request is marked with the inherent identity information of the access device 112, but any information associated with the access device 112 may also be used as the identity information to mark this access request. Therefore, the identity information of the access device only needs to indicate the correspondence relationship or association relationship with respective access device without departing from the scope of the present disclosure. In addition, the above description of the NOC 120 is also exemplary, and not limiting the present invention. In order to explain the principle of the above solution more clearly, a data access process will be described in more detail below with reference to FIG. 1.

Figure 2:
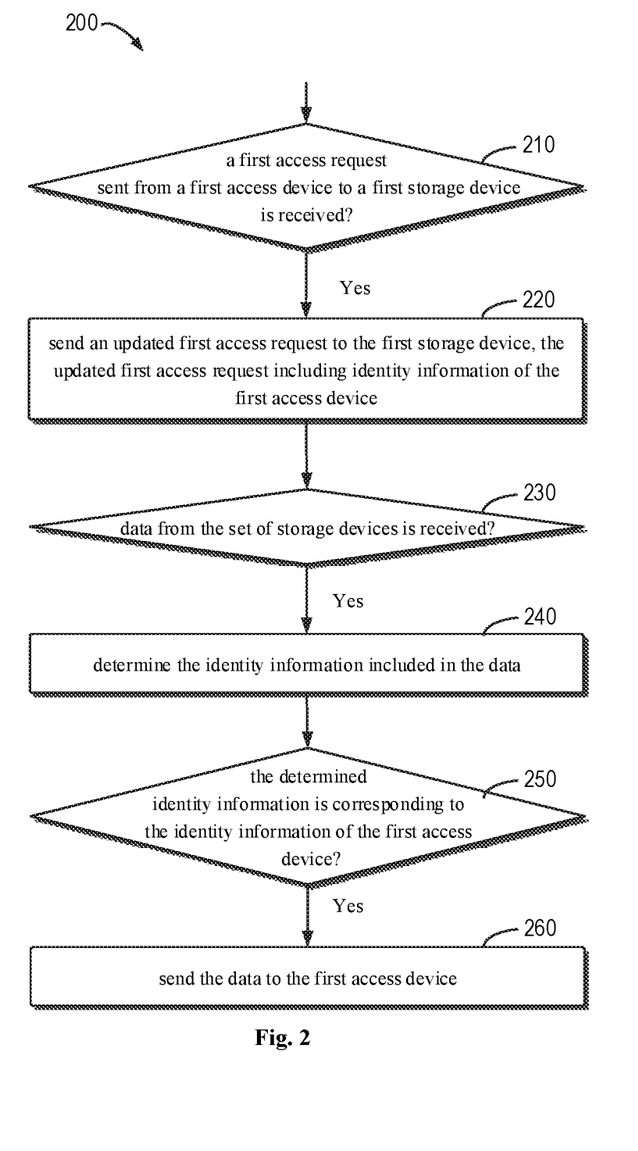
FIG. 2 illustrates a flow chart of a data access process according to an embodiment of the present disclosure.

FIG. 2 illustrates a flow chart of a data access process 200 according to an embodiment of the present disclosure. The process 200 may be implemented by the processing device 150 of FIG. 1. For ease of discussion, the process 200 will be described in conjunction with FIG. 1.

At 210, the processing device 150 may first determine whether a first access request is received, which is sent from one (such as the access device 112) in the set 110 of access devices to the storage device 130. The processing device 150 continues the detection and determination if the processing device 150 has not received any access request. The process proceeds to 220 if the processing device 150 receives the first access request sent from the access device 112 to the storage device 130.

Figure 3:
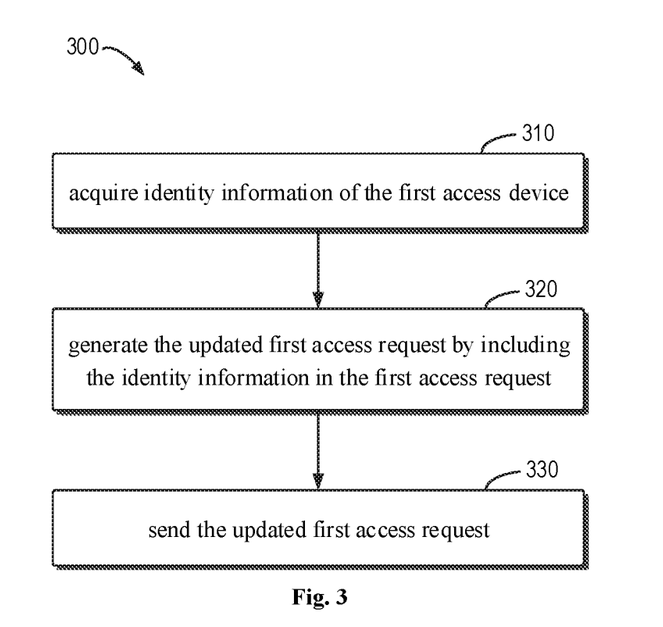
FIG. 3 illustrates a flow chart of a process of processing an access request according to an embodiment of the present disclosure.

At 220, the processing device 150 may send an updated first access request to the storage device 112, in which the updated first access request includes the identity information of the first access device. In some embodiments, the first access request may be processed so that it is marked with the identity information of the storage device 112. FIG. 3 illustrates a flow chart of a process 330 of processing an access request according to an embodiment of the present disclosure.

At 310, the processing device 150 may acquire the identity information of the access device 112. As an example, the processing device 150 may acquire the inherent identity information of the access device 112 itself. Alternatively or additionally, the processing device 150 may acquire information having correspondence relationship with the access device 112 as the identity information of the access device 112.

At 320, the processing device 150 may generate an updated first access request by including the identity information in the first access request. As an example, the processing device 150 may process the first access request to include the identity information in the first access request, thereby generating the updated first access request. It should be noted that the identity information has an identification function which may associates the access device 112, the first access request, the data, the channel for sending the access request, and the channel for returning data together.

At 330, the processing device 150 may send the updated first access request. As an example, the processing device 150 may send the updated first access request to the NOC 120, which further sends the updated first access request to, for example, the storage device 130. Alternatively or additionally, the processing device 150 may also send the updated first access request to the storage device 130 directly or via another intermediate network. In this way, the order of the returned data may be disturbed by adding identity information, thereby facilitating the subsequent reduction on waiting time for processing each access request.

After the process 300 of processing the access request is described in detail, returning to FIG. 2, we will continue to discuss the data access process 200. The process 200 proceeds to 230 after obtaining the updated first access request containing the identity information of the access device 112.

At 230, the processing device 150 may determine whether the data from the set 160 of storage devices has been received. If the processing device 150 has not received any data from the set 160 of storage devices, it continues to perform detection and determination. If the processing device 150 receives the data from the set 160 of storage devices, it proceeds to 240.

At 240, the processing device 150 may determine the identity information included in the data. As an example, the processing device 150 may analyze the received data and acquire the identity information in the data. Alternatively or additionally, processing device 150 may also know the channel of returning the data by analyzing the data, and then prepare for the subsequent determination of returning the data to the access device 112.

At 250, the processing device 150 may determine whether the determined identity information is corresponding to the identity information of the access device 112. If the determined identity information is not corresponding to the identity information of the access device 112, it indicates that the data belongs to other access device, such as the access device 114. And if the determined identity information is corresponding to the identity information of the access device 112, the process 200 proceeds to 260.

At 260, the processing device 150 may send the data to the access device 114. It should be noted that the processing device 150 may also know the identity information of the access device to which the data belongs by analyzing the data. In addition, as described previously, since the identity information may associate the access device 112 with the channel of returning the data, the processing device 150 may learn the channel of returning the data by analyzing the data, and then determine the access device associated with this channel, that is, the access device to which the data belongs. In this way, the order of the data received at a side of the set 110 of access devices may be disturbed, thereby saving the waiting time for the data of the previous access request to be returned.

It should be noted that, in order to reduce the complexity of the NOC 120, the set 110 of access devices is generally provided with only one port. Therefore, if the processing device 150 receives access requests from a plurality of access devices (such as the access device 112, and the access device 114), the access requests may be processed serially. As an example, during the process of processing the access device 112, the process 200 may further include that the processing device 150 determines whether a second access request sent from the access device 114 in the set 110 of access devices to the storage device 140 in the set 160 of storage devices is received. If the processing device 150 receives the second access request sent from the access device 114 to the storage device 140, it is further determined whether the previous first access request has been sent. If it is determined that the first access request has been sent, the processing device 150 sends the updated second access request to the storage device 140, the updated second access request including the identity information of the access device 114. Then the updated second access request is sent via the NOC 120 to the storage device 140. In this way, whenever the processing device 150 processes multiple access requests serially, the processing device 150 may process the next access request once the current access request is sent by the processing device 150, without awaiting that the data of the current access request is returned as in the traditional data access mechanism. Therefore, the above method significantly reduces the waiting time and avoids severe memory access block.

In addition, in order to further alleviate memory access block, the number of ports of the set 110 of access devices may be increased to a limited extent. As an example, the set 110 of access devices may have two ports, that is, a first port and a second port, so that the parallel processing of multiple access requests is achieved. For example, the above first access request may be received via the first port of the set 110 of access devices, and the above second access request may be received via the second port of the set 110 of access devices.

Compared with the conventional technology, the solution of the present disclosure may disturb the order of each returned data by adding the identity information of each access device. In this way, there is no need to wait for a time period of the entire data access of the current access request, but only wait for a time period of processing the current access request, and then processing the next access request may be performed. In addition, since the number of ports of the set 110 of access devices is not significantly increased, the number of access devices of the set 110 of access devices may be expanded and upgraded, and the impact of expansion and upgrade on the entire system-on-chip is reduced.

For the system-on-chip of the present disclosure, embodiments of the present disclosure described above make full use of the integration protocol property of system-on-chip, only add a step of adding identity information, and eliminate the problem of memory access block between multiple access devices in the set 110 of access devices with minimal cost, which does not adversely affect complexity, power consumption of hardware, or even occupied area of the system.

The example in which two access devices 112 and 114 access two storage devices 130 and 140 via the NOC 120 in some example scenarios is discussed above. It should be understood, however, that the description of these scenarios is merely to explain embodiments of the present disclosure by way of examples. Depending on actual needs, other situations may exist in different or similar scenarios. It should also be noted that the technical solution of the present disclosure is not limited to be applied to the field of NOC in essence, and the technical solution of the present disclosure may also have various advantages mentioned above when applied to other data access fields.

Figure 4:
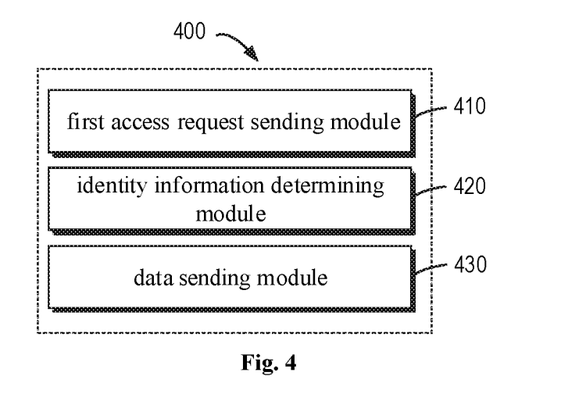
FIG. 4 illustrates a schematic block diagram of an apparatus for implementing data access according to an embodiment of the present disclosure.

FIG. 4 illustrates a schematic block diagram of an apparatus 400 for implementing data access according to an embodiment of the present disclosure. As illustrated in FIG. 4, the apparatus 400 may include a first access request sending module 410, an identity information determining module 420 and a data sending module 430. The first access request sending module 410 is configured to, in response to receiving a first access request sent from the access device 112 in the set 110 of access devices to the storage device 130 in the set 160 of storage devices, send an updated first access request to the storage device 130, the updated first access request including identity information of the access device 112. The identity information determining module 420 is configured to, in response to receiving data from the set 160 of storage devices, determine identity information included in the data. The data sending module 430 is configured to send the data to access device 112, in response to the determined identity information being corresponding to the identity information of access device 112.

In some embodiments, the first access request sending module 410 may further include an identity information acquiring module (not shown), an updating module (not shown) and an updated request sending module (not shown). The identity information acquiring module is configured to acquire the identity information of the access device 112. The updating module is configured to generate the updated first access request by including the identity information in the first access request. The updated request sending module is configured to send the updated first access request.

In some embodiments, the updated first access request is sent via a network-on-chip to the storage device 112.

In some embodiments, the apparatus 400 may further include a sending determining module (not shown) and a second access request sending module (not shown). The sending determining module is configured to, in response to receiving a second access request sent from the access device 114 in the set 110 of access devices to the storage device 140 in the set 160 of storage devices, determine whether the first access request has been sent. The second access request sending module is configured to, in response to determining that the first access request has been sent, send the updated second access request to the storage device 140, the updated second access request including the identity information of the access device 114.

In some embodiments, the first access request is received via the first port of the set 110 of access devices, and the second access request is received via the second port of the set 110 of access devices.

In some embodiments, the storage device 130 and the storage device 140 are the same, being a same storage device.

In some embodiments, the updated second access request is sent via the NOC 120 to the storage device 140.

Figure 5:
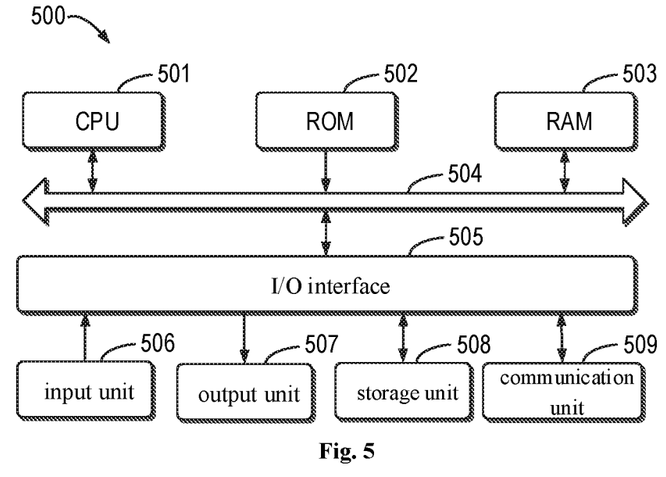
FIG. 5 illustrates a block diagram of a computing device capable of implementing various embodiments of the present disclosure.

FIG. 5 illustrates a schematic block diagram of an example device 500 which may be used to implement embodiments of the present disclosure. As illustrated in FIG. 5, the device 500 includes a central processing unit (CPU) 501, which may perform various appropriate actions and processes according to computer program instructions stored in a read only memory (ROM) 502 or computer program instructions loaded from a storage unit 508 into a random access memory (RAM) 503. In RAM 503, various programs and data required for the operation of the device 500 may also be stored. CPU 501, ROM 502, and RAM 503 are connected to each other through a bus 504. An input/output (I/O) interface 505 is also connected to the bus 504.

A plurality of components in the device 500 are connected to the I/O interface 505, including: an input unit 506, e.g., a keyboard, a mouse, etc.; an output unit 507, e.g., various types of displays, speakers, etc.; a storage unit 508, e.g., a magnetic disk, an optical disk, etc.; and a communication unit 509, e.g. network card, modem, wireless communication transceiver, etc. The communication unit 509 allows the device 500 to exchange information/data with other devices through a computer network such as the Internet and/or various telecommunication networks.

The processing unit 501 performs various methods and processes described above, e.g., process 200 or 300. For example, in some embodiments, the process 200 or 300 may be implemented as a computer software program that is tangibly embodied on a machine-readable medium, e.g., storage unit 508. In some embodiments, part or all of the computer programs may be loaded and/or installed into the device 500 via ROM 502 and/or communication unit 509. When a computer program is loaded into RAM 503 and executed by CPU 501, one or more steps of the process 300 described above may be performed. Alternatively, in other embodiments, CPU 501 may be configured to perform the process 200 or 300 by any other suitable means (for example, by means of firmware).

Functions described above herein may be performed, at least in part, by one or more hardware logic components. For example, exemplary types of hardware logic components that may be used include, without limitation: a field programmable gate array (FPGA), an application specific integrated circuit (ASIC), an application specific standard product (ASSP), a system on chip (SOC), a complex programmable logic device (CPLD) and so on.

Program codes for implementing methods of the present disclosure may be written in any combination of one or more programming languages. These program codes may be provided to a processor or controller of a general-purpose computer, special-purpose computer or other programmable data processing apparatus, so that program codes, when executed by the processor or controller, cause the functions/operations specified in the flow charts and/or block diagrams to be performed. The program code may be executed entirely on a machine, partly on the machine, as a separate software package, partly on the machine, partly on a remote machine, or entirely on the remote machine or server.

In the context of the present disclosure, the machine-readable medium may be a tangible medium that may include or store a program, which is used by or in connection with an instruction executed system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, apparatus or device, or any suitable combination thereof. More specific examples of the machine-readable storage medium include an electrical connection based on one or more wires, a portable computer disk, a hard disk, a random access memory (RAM), a read-only memory (ROM), an erasable programmable read-only memory (EPROM) or a flash memory, an optical fiber, a compact disc read-only memory (CD-ROM), an optical storage device, a magnetic storage device, or any suitable combination thereof.

Furthermore, although operations are depicted in a particular order, it should be understood that these operations are required to be performed in the illustrated particular or sequential order, or that all illustrated operations are required to be performed so as to achieve the desired result. Under certain circumstance, it may be advantageous for multitasking and parallel processing. Likewise, although several specific implementation details are included in the discussion above, these should not be construed as limitations on the scope of the present disclosure. Certain features which are described in the context of separate embodiments may also be implemented in combination in a single implementation. Conversely, various features which are described in the context of a single implementation may also be implemented in multiple implementations separately or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A data access method, comprising:
    determining whether a processing device receives a first access request that is sent from a first access device in a set of access devices to a first storage device in a set of storage devices;
    in response to receiving the first access request, acquiring by the processing device, identity information of the first access device, including by the processing device, the identity information in the first access request to generate an updated first access request, and sending by the processing device, the updated first access request to the first storage device;
    in response to receiving data from the set of storage devices, determining by the processing device, identity information included in the data; and
    in response to the determined identity information being associated with the identity information of the first access device, sending by the processing device, the data to the first access device;
    wherein the method further comprises:
    in response to receiving a second access request sent from a second access device in the set of access devices to a second storage device in the set of storage devices, determining by the processing device, whether the first access request has been sent; and
    in response to determining that the first access request has been sent, including by the processing device, identity information of the second access device in the second access request to generate an updated second access request, and sending by the processing device, the updated second access request to the second storage device.

2. The method according to claim 1, wherein the updated first access request is sent via a network-on-chip from the processing device to the first storage device.

3. The method according to claim 1, wherein the first access request is received via a first port of the set of access devices, and the second access request is received via a second port of the set of access devices.

4. The method according to claim 1, wherein the first storage device is exactly the second storage device.

5. The method according to claim 1, wherein the updated second access request is sent via a network-on-chip to the second storage device.

6. A processing device, comprising:
    a processor; and
    a memory, configured to store instructions executable by the processor,
    wherein when the instructions are executed by the processor, the processor is configured to:
    determine whether the processing device receives a first access request that is sent from a first access device in a set of access devices to a first storage device in a set of storage devices;
    acquire identity information of the first access device, include the identity information in the first access request to generate an updated first access request, and send the updated first access request to the first storage device, in response to receiving the first access request;
    in response to receiving data from the set of storage devices, determine identity information included in the data; and
    send the data to the first access device, in response to the determined identity information being associated with the identity information of the first access device;
    wherein the processor is further configured to:
    in response to receiving a second access request sent from a second access device in the set of access devices to a second storage device in the set of storage devices, determine whether the first access request has been sent; and
    in response to determining that the first access request has been sent, include identity information of the second access device in the second access request to generate an updated second access request, and send the updated second access request to the second storage device.

7. The apparatus according to claim 6, wherein the updated first access request is sent via a network-on-chip from the processing device to the first storage device.

8. The apparatus according to claim 6, wherein the first access request is received via a first port of the set of access devices, and the second access request is received via a second port of the set of access devices.

9. The apparatus according to claim 6, wherein the first storage device is exactly the second storage device.

10. The apparatus according to claim 6, wherein the updated second access request is sent via a network-on-chip to the second storage device.

11. A non-transitory computer-readable storage medium, having computer programs stored thereon which, when executed by a processor, carry out a data access method, the method comprising:

in response to receiving the first access request, acquiring by the processing device, identity information of the first access device, including by the processing device, the identity information in the first access request to generate an updated first access request, and sending by the processing device, the updated first access request to the first storage device;

in response to receiving data from the set of storage devices, determining by the processing device, identity information included in the data; and  in response to the determined identity information being associated with the identity information of the first access device, sending by the processing device, the data to the first access device;

wherein the method further comprises:

in response to receiving a second access request sent from a second access device in the set of access devices to a second storage device in the set of storage devices, determining by the processing device, whether the first access request has been sent and  in response to determining that the first access request has been sent, including by the processing device, identity information of the second access device in the second access request to generate an updated second access request, and sending by the processing device, the updated second access request to the second storage device.

\* \* \* \* \*